Nov. 1, 1932.  M. CHARLES  1,885,683
BRAKE WHEEL FOR AIRPLANES
Filed July 14, 1931
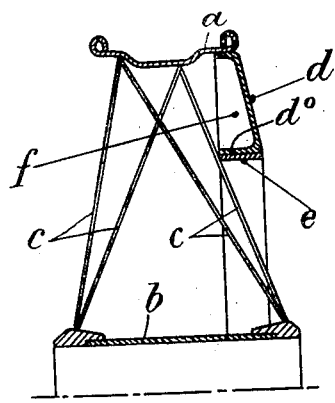
INVENTOR!
Maurice Charles
By Mauro + Lewis
Attorneys Patented Nov. 1, 1932

1,885,683

UNITED STATES PATENT OFFICE

MAURICE CHARLES, OF COURBEVOIE, FRANCE

BRAKE WHEEL FOR AIRPLANES

Application filed July 14, 1931, Serial No. 550,781, and in France July 21, 1930.

The object of my invention is to provide improvements in brake wheels for airplanes and, particularly, to standard wire spoke wheels.

According to my invention, it is possible to obtain a light wheel, affording considerable resistance to the oblique stresses which are often developed in airplane wheels at the time of landing and to the stresses due to the braking torque. My invention consists in providing a transversal racing of the wheel by inserting, inside the rim, an annular cheek comprising radial ribs in which the brake drum may be located.

Another advantage of my invention consists in the fact that, by securing the brake drum to the rim, any twisting of the spokes, such as takes place when the drum is secured to the axle, is avoided.

Preferred embodiments of my invention will be hereinafter described with reference to the accompanying drawing given merely by way of example and in which:

The only figure of the drawing is a cross section of a standard wheel provided with a brake drum according to my invention.

As shown in said figure, the wheel comprises a rim $a$, of a size corresponding to the tires which are to be fitted thereon, said rim $a$ being connected through spokes $c$ to axle $b$, the bore and length of the latter corresponding to the dimensions of the axle journals.

The transversal reinforcement is obtained by providing a cast ring, or disk $d$, secured by its periphery, in any suitable manner, to rim $a$. Ring $d$ may comprise a flange $d^o$ forming an annular recess in which is placed and secured the steel ring $e$ or brake drum against which the brake shoes will be applied when the brake is acting. A series of edgewise ribs $f$ are provided in ring $d$. Said ribs insure the rigidity of the drum and of the wheel in the transverse direction.

While I have disclosed what I deem to be preferred embodiments of my device, I do not wish to be limited thereto, as there might be changes made in the construction, disposition and form of the parts without departing from the spirit of my invention as comprehended within the scope of the appended claims.

What I claim is:
1. A wheel for airplanes comprising in combination, a hub, a rim, metallic spokes for connecting said hub to said rim, a metallic ring, independent of said spokes, located substantially in the plane of the wheel, a flange on the outer edge of said ring engaging the inner face of said rim and fixed thereto, another flange, of cylindrical shape, on the inner edge of said ring, adapted to receive a brake drum, and a plurality of ribs, extending radially between said flanges and integral therewith, for reinforcing said ring.

2. A wheel for airplanes comprising in combination, a hub, a rim, metallic spokes for connecting said hub to said rim, a metallic ring independent of said spokes having a conical shape, a cylindrical flange integral with said ring on the outer edge thereof engaging the inner face of said rim and fixed thereto, another cylindrical flange integral with said ring on the inner edge thereof adapted to receive a brake drum, and a plurality of ribs, extending radially between said flanges and integral therewith, for reinforcing said ring.

In testimony whereof I have signed this specification.

MAURICE CHARLES.